Figure 1:
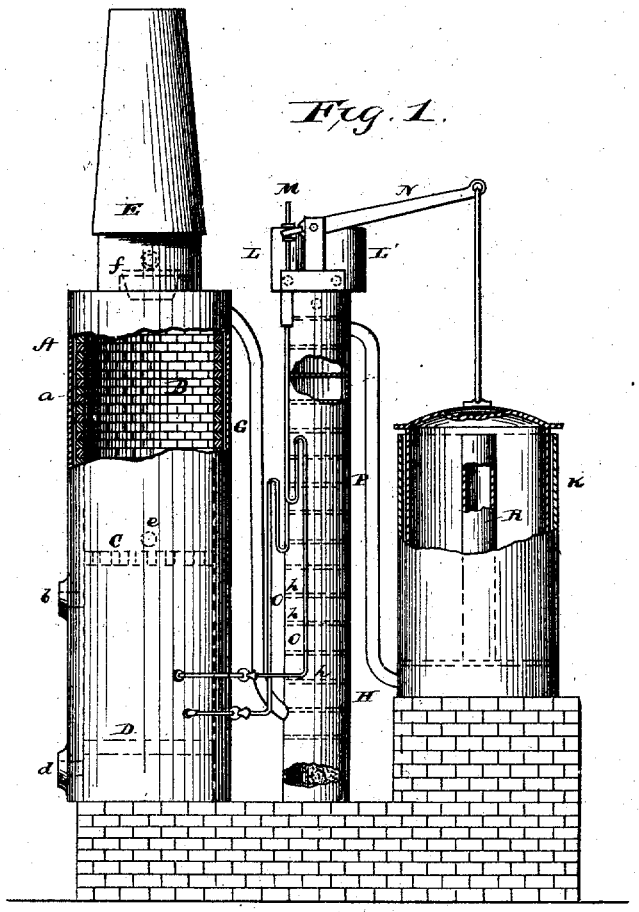

T. G. SPRINGER.

PROCESS OF AND APPARATUS FOR THE MANUFACTURE OF GAS.

No. 10,032. Reissued Feb. 7, 1882.

Witnesses.
Edwin L. Yercle
H. Aubrey Toulmin

Inventor
T. G. Springer.
By C. M. Alexander
his Attorney.

UNITED STATES PATENT OFFICE.

THEODORE G. SPRINGER, OF NEW YORK, N. Y.

PROCESS OF AND APPARATUS FOR THE MANUFACTURE OF GAS.

SPECIFICATION forming part of Reissued Letters Patent No. 10,032, dated February 7, 1882.

Original No. 196,495, dated October 23, 1877. Application for reissue filed January 10, 1882.

*To all whom it may concern:*

Be it known that I, THEO. G. SPRINGER, of New York, in the county of New York, and in the State of New York, have invented certain new and useful Improvements in Processes of and Apparatus for the Manufacture of Gas; and I do hereby declare that the following is a full, clear, and exact description thereof, reference being had to the accompanying drawings and the letters of reference marked thereon, making a part of this specification.

This invention relates to certain improvements in processes and apparatus for the manufacture of gas; and it has for its objects to provide certain means whereby the heat necessary to decompose the gas-producing material may be stored up and utilized for the generation of gas in quantities as required for use, as more fully hereinafter specified.

Heretofore in the manufacture of gas the gas-producing material, consisting of solid or liquid hydrocarbons, either alone or in conjunction with water, has been invariably subjected to decomposition in retorts or generators of limited capacity, and the gas as generated has been collected and stored in a suitable holder or holders. In order, however, to store a supply of gas at all adequate to the demands, especially in large cities, very large gas-holders or a series of holders are required, which are expensive and occupy a large amount of valuable room. In the present process, by storing up the heat and generating the gas as required for use, and in quantities only to supply the demand for the time being, such holders may be dispensed with entirely, or reduced in size to such an extent as to serve simply as regulators or governors, in which case they will occupy comparatively little room. Hence I am enabled to put in works for a single section of a city—say a block, for instance—which would not be practicable under the old process, owing to the room and smell attending the storing of the gas, and as the mains, where the works are distributed according to my invention, can be made much smaller than usual, it is evident that by my process and apparatus a city may be lighted at much less cost than by the old process. Again, it is well known that the gas-producing hydrocarbons can only be decomposed to produce a fixed gas at an elevated temperature, and it has heretofore been deemed necessary to employ retorts or generators of small capacity as the only practical means by which the gas-producing material could be subjected to a heat of the required intensity, and hence the necessity of storing up the gas for use, as it was impracticable under the old process to meet a continuous demand for gas for any length of time by means of the small retorts or generators in use without large holders.

I have discovered that by constructing a generator of such capacity that a large amount of refractory material capable of absorbing and afterward giving off heat may be retained in mass in the generator such material may be heated to the proper temperature and the heat stored up for future or subsequent use in such manner that the gas may be continuously generated in quantities to supply any required demand. Moreover, I have discovered that the loss of heat by radiation diminishes rapidly as the capacity of the generator is increased, since the cubic capacity increases in geometrical proportion, while the superficial area or radiating-surface increases in arithmetical proportion. For instance, in a rectangular generator of one cubic foot capacity the radiating-surface, which would consist almost wholly of the vertical sides of the generator, would be four square feet, while in a generator of ten times the superficial area—that is to say, forty square feet—the cubic capacity would be one hundred cubic feet. As the radiation is only at the outside of the generator, it is evident that by thus having a large body of material in mass a great saving of heat is effected, as the central portions of the mass radiate no heat whatever, and will retain the heat imparted to such portions a sufficient time to render it possible and practicable to store up the heat necessary for decomposing the gas-producing material effectually in quantities as demanded.

Another source of loss of heat heretofore experienced in cupola-generators, to which my invention is particularly applicable, has arisen from the fact that the generator, or "superheater," as it has sometimes been denominated, has always been made entirely separate from the combustion-chamber or furnace, causing loss by reason of the extended radiating-surface attendant upon such construction. This objection I obviate by having the combustion-chamber and generator in one structure, as more fully hereinafter specified.

Figure 2:
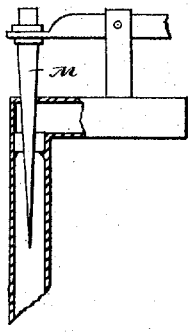
Figure 3:
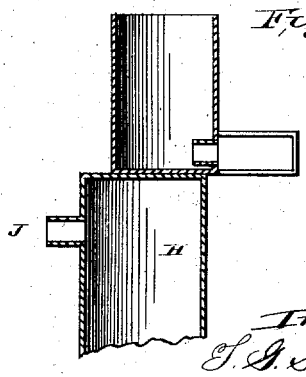

In the annexed drawings, Figure 1 is a side elevation, partly in section, of my apparatus, and Figs. 2 and 3 are detailed views of parts thereof.

The generator A is made of boiler-iron tightly riveted together. The inside is lined with fire-bricks B, so arranged as to leave a dead-air space, *a*, of about three inches between the lining and the outside shell. This generator stands perpendicular, and has a perforated diaphragm, C, about the center, above which the generator is filled with some refractory porous substance. Directly below the division C is a door, *b*, tightly fitted, to admit coal, and about fourteen inches above the lower end of the generator is a grate, D, to receive the coal. Below this grate is another door, *d*, fitted as above, which serves to admit air in heating the generator and to remove the ashes. A little above the division C is a pipe, *e*, as shown. In the top of the generator is an opening having a valve, *f*, and also a stack or pipe, E, which serves as a chimney to increase the draft. The stack or pipe E, when the machine is being operated, will be provided with a chain and pulleys, so as to easily raise or lower the same.

G is a pipe which conducts the gas from the generator A B to the washer and cooler H, and should be provided with a stop-cock. The washer and cooler H is provided with a series of perforated diaphragms or divisions, *h*, and at the lower end it is to be provided with a siphon-pipe to allow the water to flow off without permitting any gas to follow. The upper end of the cooler is provided with a pipe, J, to admit a flow of water regulated by a cock. This cock can be automatically operated by the rise and fall of the governor K, so as to admit just the quantity of water to cool the amount of gas being made.

On top of the cooler are two tanks, L L′, to contain respectively water and naphtha or petroleum. These tanks are provided with a cock or device, M, operated by a lever, N, from the governor, for automatically discharging the exact quantity of petroleum or naphtha and water as is required to make the amount of gas being consumed.

O O are the pipes connecting the tanks with the generator, said pipes being provided with suitable stop-cocks.

P is the pipe which carries the gas from the cooler to the governor.

R is the connection from the governor to the pipes, where the gas is to be consumed.

The apparatus being set up ready to operate, a fire is made in the lower part of the cupola on the grate D, and after being fairly started coal is put into the generator through the door *b*, filling the generator nearly up to said door, when the door is closed. When the coal becomes well heated and is burning nicely an air-blast is turned on through the pipe *e* into the lower part of the upper chamber of the cupola, which ignites the products of combustion, and in a short time the apparatus is at a very high degree of heat and is ready to make gas. The cupola being heated by internal combustion, every foot of surface that is heated can be used to generate gas. When the proper degree of heat is attained the air-blast is turned off, the lower door, *d*, closed, the stack raised, and the valve *f* fitted down gas-tight. Then by opening the cocks in the pipes G and O O the naphtha and water flow into the lower part of the generator, and are instantly converted into carbonic-oxide gas and carbureted hydrogen, and force their way through the pipe G into the washer H, passing up through the perforated divisions, meeting the water which is flowing into the washer, and the gas is thereby thoroughly washed and cooled. From the washer the gas is forced through the pipe P into the governor, which instantly begins to rise and operates on the device for admitting and closing off the water and naphtha, and only allows enough to enter the generator to supply the amount of lights being used.

Two cupolas or generators may be used, if desired, and one may be fired up while the other is working off its heat. The generator will be heavily covered with some non-conducting material to prevent radiation of heat.

Having thus described my invention, what I claim, and desire to secure by Letters Patent, is—

1. The herein-described process of manufacturing gas, the same consisting in the following steps, to wit: raising to incandescence a mass of carbonaceous material by a current of air, producing carbonic oxide; then burning the carbonic oxide by means of air above the bed of carbonaceous material and causing the products to pass into a mass of refractory material for highly heating the same; then decomposing water and naphtha by the incandescent carbonaceous material, producing water-gas; and finally fixing such gas by passing it through the mass of highly-heated refractory material, substantially as specified.

2. The method herein described of producing gas by storing up in a mass of refractory material the heat generated and carried off by the ignited gas evolved from the burning fuel while it is being prepared to decompose the liquid gas stock into mixed gases, and subsequently utilizing such heat by converting the mixed gases produced from liquid gas stock in contact with incandescent fuel into a fixed gas by passing such gases into and through the refractory material, substantially as described.

3. A cupola or gas-generating apparatus having a combustion and decomposing chamber for burning solid hydrocarbons, wherein water and hydrocarbon may be mutually decomposed, and a fixing-chamber partly or wholly filled with some refractory material for absorbing heat and converting the hot gases from the combustion-chamber into a fixed gas, the two chambers being formed in one structure, substantially as and for the purpose specified.

4. A cupola or gas-generating apparatus having a decomposing and combustion chamber, a perforated diaphragm at the top thereof, and a fixing-chamber containing refractory material above, and provided with an air-supply pipe for supplying air to support combustion of gases from the lower chamber for storing heat in the fixing-chamber, for the purpose specified.

5. The process of making a fixed illuminating-gas by feeding hydrocarbon liquid and water automatically, in proportion as the gas is consumed, into an incandescent body of coal in the combustion-chamber of the cupola or generator, and forcing the gas and water there generated through a heat-absorber for making a fixed gas, as set forth.

6. In combination with a gas-holder and an automatic regulator, a gas-generator consisting of an exterior shell and interior lining, with air-space between them, and a perforated division or diaphragm inside the lining, forming a heat-absorber above a combustion-chamber below the division, whereby the heat may be stored during the day-time for use in the manufacture of illuminating-gas at night in the proportion as such gas is being consumed, as set forth.

7. The generator consisting of the outer shell, A, inner brick lining, B, and space *a* between them, and provided with doors *b d*, perforated diaphragm C, grate D, air-pipe *e*, valve *f*, and stack E, all substantially as and for the purposes set forth.

In testimony that I claim the foregoing I have hereunto set my hand this 10th day of January, 1882.

T. G. SPRINGER.

Witnesses:
C. A. NEALE,
J. J. MCCARTHY.